United States Patent [19]

Nishikawa

[11] Patent Number: 4,745,487
[45] Date of Patent: May 17, 1988

[54] HELICAL SCANNING APPARATUS WITH ONE OR MORE ROWS OF SCANNING ELEMENTS AND AN OBJECT OF SCANNING DISPOSED AT AN ANGLE TO THE AXIS OF A ROTATING DRUM TO ELIMINATE SKEW OF SCANNING LINES

[75] Inventor: Masaji Nishikawa, Tokyo, Japan

[73] Assignee: Olympus Optical Co., Ltd., Tokyo, Japan

[21] Appl. No.: 742,090

[22] Filed: Jun. 6, 1985

[30] Foreign Application Priority Data

Jun. 15, 1984 [JP] Japan .................. 59-122099
Jul. 11, 1984 [JP] Japan .................. 59-142160

[51] Int. Cl.$^4$ .................. H04N 1/06; H04N 1/04
[52] U.S. Cl. .................. 358/289; 358/285
[58] Field of Search .................. 358/285, 289, 290, 291, 358/75

[56] References Cited

U.S. PATENT DOCUMENTS

| | | | |
|---|---|---|---|
| 4,268,870 | 5/1981 | Kitamura et al. .................. | 358/285 |
| 4,591,880 | 5/1986 | Mitsuka .................. | 358/289 |

FOREIGN PATENT DOCUMENTS

| | | | |
|---|---|---|---|
| 55663 | 4/1980 | Japan .................. | 358/285 |
| 27571 | 3/1981 | Japan .................. | 358/294 |
| 152269 | 9/1982 | Japan .................. | 358/289 |
| 111566 | 7/1983 | Japan .................. | 358/289 |
| 165478 | 9/1983 | Japan .................. | 358/75 |
| 205368 | 11/1983 | Japan .................. | 358/285 |
| 2129650 | 5/1984 | United Kingdom .................. | 358/289 |

OTHER PUBLICATIONS

Garwin, R. L., et al., "Use of Tilted Arrays in Display Devices and Scanners", *IBM Technical Disclosure Bulletin*, vol. 20, No. 1, Jun. 1977, pp. 396-399.

Luttman, E. W., "Color Transparency Copier", IBM Technical Disclosre Bulletin, vol, 22, No. 6, Nov. 1979, p. 2467.

*Primary Examiner*—James J. Groody
*Assistant Examiner*—Randall S. Svihla
*Attorney, Agent, or Firm*—Frishauf, Holtz, Goodman & Woodward

[57] ABSTRACT

A rotating-drum scanning apparatus includes a rotating drum and a feed mechanism for feeding a rectangular sheet to the drum and winding it around the drum so that one side of the sheet is inclined at an angle $\theta$ to the axis of the drum. In a first embodiments, a scanning head is disposed to be movable in a direction parallel to the axis of the drum and includes a plurality of scanning elements arranged along a line parallel to the axis of the drum. These elements form on the sheet scanning lines extending at right angles to said one side of the sheet as the drum and the scanning head move. The angle $\theta$ is given by $\theta = \tan^{-1} \Delta L / L$, where L is the circumference of the drum and $\Delta L$ is the distance covered by the scanning head while the drum makes one revolution. Another embodiment is similar to the first embodiment except that it arranges the scanning elements along a line which is also inclined at the angle $\theta$ to the axis of the drum while the scanning head moves in a direction parallel to the axis of the drum. A third embodiment is similar to the second embodiment except that the scanning head also moves in a direction inclined at the angle $\theta$ to the axis of the drum. Yet another embodiment is similar to the first embodiment except that the scanning head has a plurality of rows of scanning elements, with these rows being spaced from each other in a direction perpendicular to the axis of the drum.

15 Claims, 5 Drawing Sheets

HELICAL SCANNING APPARATUS WITH ONE OR MORE ROWS OF SCANNING ELEMENTS AND AN OBJECT OF SCANNING DISPOSED AT AN ANGLE TO THE AXIS OF A ROTATING DRUM TO ELIMINATE SKEW OF SCANNING LINES

BACKGROUND OF THE INVENTION

The present invention relates to a rotating-drum scanning apparatus with a scanning head including a plurality of scanning elements.

Rotating-drum scanning apparatuses are conventionally known in which an original copy is wound around a rotating drum and information on the original is read by a photoelectric sensor, or in which a recording sheet is wound around the rotating drum and an image is recorded on the recording sheet by means of a recording head including recording elements, such as an ink-jet nozzle, electric discharge recording stylus, electrostatic recording stylus, heat generating element, etc.

In general, a rotating-drum scanning apparatus comprises a rotating drum, a guide shaft extending parallel to the axis of the rotating drum, and a scanning head supported by the guide shaft and movable parallel to the axis of the drum, the scanning head including one scanning element. A rectangular original or recording sheet as an object of scanning is wound around the outer peripheral surface of the rotating drum so that its one side extends parallel to the axis of the drum. In this state, the rotating drum is rotated at a fixed speed so that the object on the rotating drum is subjected to primary scanning in the circumferential direction of the drum by the scanning head. As the scanning head is moved in one direction at a fixed speed, synchronized with the rotation of the drum, moreover, the object is subjected to secondary scanning in the axial direction of the drum by the scanning head. As a result, a scanning line substantially perpendicular to the axis of the drum is formed on the object by the scanning element every time the rotating drum makes one revolution.

In the scanning apparatus constructed in this manner, the object on the drum is scanned at high speed by means of a multi-type scanning head which includes a plurality of scanning elements arranged in a straight line in the secondary-scanning direction. If a plurality of, e.g., five, scanning elements are arranged at predetermined pitches in the secondary-scanning direction, the scanning head is moved in the secondary-scanning direction over a distance about five times as long as the distance for a scanning head with a single scanning element while the rotating drum makes one revolution. If scanning is performed in synchronism with the rotation of the rotating drum, therefore, each scanning element spirally scans the outer peripheral surface of the drum, forming a scanning line at an angle to a direction perpendicular to the axis of the drum. If the circumference of the drum is L and the distance covered by the scanning head for each revolution of the rotating drum is $\Delta L$, the tilt angle $\alpha$ of the scanning line with respect to the direction perpendicular to the axis of the drum is given by $$\alpha = \tan^{-1} \Delta L/L. \tag{1}$$

If a scanning head with a single scanning element is used for scanning, the distance $\Delta L$ is about 0.05 to 0.2 mm, the length L is about 200 to 300 mm, and the tilt angle $\alpha$ is negligible. If a scanning head with a plurality of, e.g., ten, scanning elements are used, on the other hand, the distance $\Delta L$ is about 1 mm, and the tilt angle $\alpha$ of the scanning lines is too large to be ignored. It is very difficult to remove the tilt of the scanning lines in the primary-scanning direction by electrical signal processing.

To prevent the tilting of the scanning lines, a method is proposed in which the scanning head is stopped during primary-scanning cycles so that it is intermittently moved for secondary scanning, taking advantage of the intervals between the primary-scanning cycles. In this case, however, the primary and secondary scanning operations cannot simultaneously be performed, so that the total scanning time is long. Moreover, the scanning head needs to be accurately intermittently moved, requiring a sophisticated, expensive drive mechanism.

When using a plurality of scanning heads for color-print recording, the scanning heads are arranged along the circumference of the rotating drum. In this case, the individual scanning heads are moved with staggered timing, so that they require independent drive units of their own, resulting in a complicated and expensive drive mechanism. If a plurality of scanning heads are arranged in the secondary-scanning direction, furthermore, the scanning operation is time-consuming as a whole.

SUMMARY OF THE INVENTION

The present invention is contrived in consideration of these circumstances, and is intended to provide a rotating-drum scanning apparatus capable of high-speed scanning in which skew in the primary-scanning direction with respect to the surface to be scanned can be prevented by a simple construction.

In order to achieve the above object, a scanning apparatus according to the present invention comprises a rotating drum disposed for rotation, feed means for feeding a rectangular object of scanning to the rotating drum and winding the object around the drum so that one side of the object is inclined at a predetermined angle to the axis of the rotating drum, a scanning head movable in a predetermined direction along the outer peripheral surface of the rotating drum, the scanning head including a plurality of scanning elements adapted to form on the object scanning lines extending at right angles to said one side of the object as the rotating drum and the scanning head move, and drive means for rotating the rotating drum and driving the scanning head in synchronism with the rotation of the drum.

BRIEF DESCRIPTION OF THE DRAWINGS

FIGS. 1 to 4B show a scanning apparatus according to one embodiment of the present invention, in which FIG. 1 is a perspective view of the scanning apparatus, FIG. 2 is a sectional view, FIG. 3 is a top view, FIG. 4B is a development of a surface to be scanned;

FIGS. 5A and 5B show a first modification of the invention, in which FIG. 5A is a side view corresponding to FIG. 4A, and FIG. 5B is a development corresponding to FIG. 4B;

FIGS. 6A and 6B show a second modification of the invention, in which FIG. 6A is a side view corresponding to FIG. 4A, and FIG. 6B is a development corresponding to FIG. 4B;

FIGS. 7A and 7B show a third modification of the invention, in which FIG. 7A is a side view corresponding to FIG. 4A, and FIG. 7B is a sectional view taken along line I—I of FIG. 7A.

DETAILED DESCRIPTION OF THE PREFERRED EMBODIMENT

An embodiment of the present invention will now be described in detail with reference to the accompanying drawings.

Figure 1:
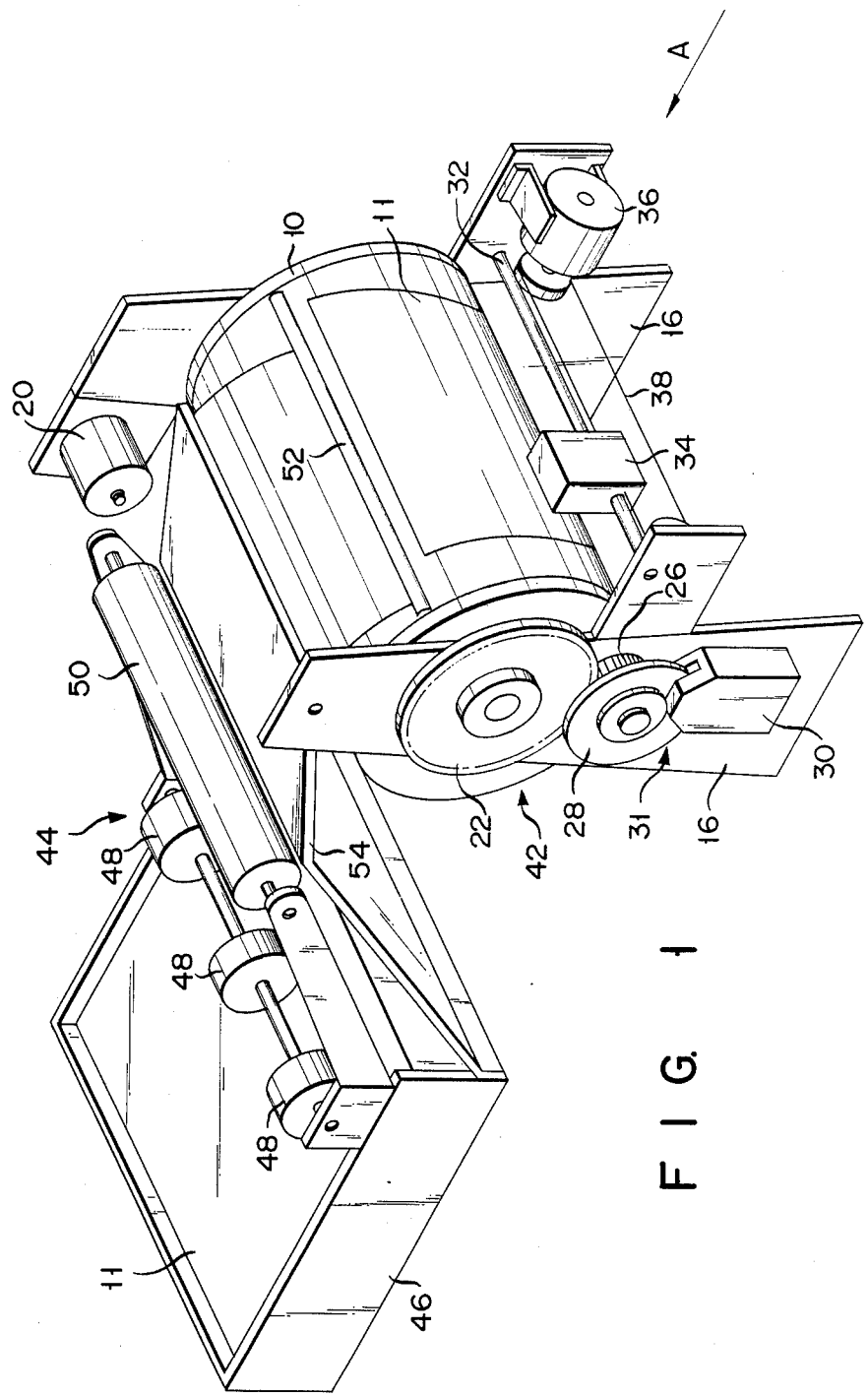
Figure 2:
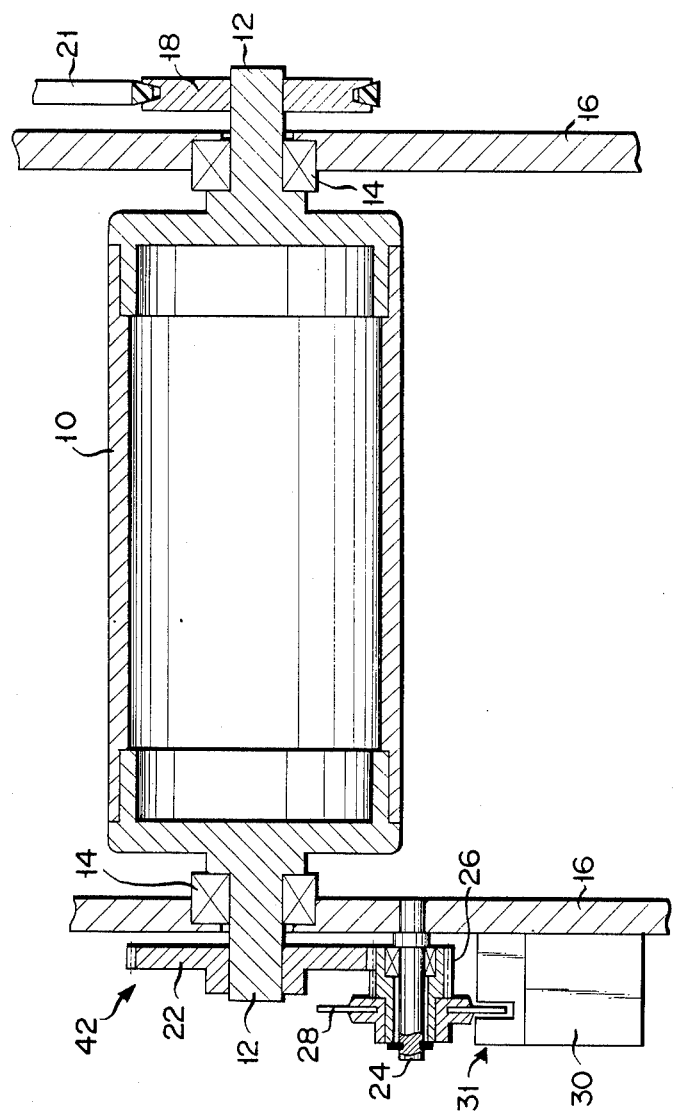

As shown in FIGS. 1 and 2, a rotating-drum scanning apparatus according to the embodiment of the invention is provided with a rotating drum 10 with an object of scanning, e.g., a rectangular recording sheet 11, wound on its outer peripheral surface. A support shaft 12 of the drum 10 is rotatably supported on a support frame 16 by means of bearings 14. A driving pulley 18, which is fixed to one end of the support shaft 12, is coupled to a drum drive motor 20 on the frame 16 by means of a belt 21. The drum 10 is rotated in a predetermined direction by the motor 20. Fixed to the other end of the support shaft 12 is a driving gear 22 as a driving member which rotates together with the drum 10. A driven gear 26 as a driven member is supported on the support frame 16 by means of a shaft 24. The driven gear 26 is directly in mesh with the driving gear 22. The number of teeth of the driving gear 22 is greater than for the driven gear 26. Preferably, the number of teeth of the driving gear 22 is three times that of the driven gear 26.

A pulse generating disk 28 is fixed to the driven gear 26 so as to rotate in one therewith. Because driving gear 22 has three times as many teeth as driving gear 26, pulse generating disk 28 rotates three times as fast as drum 10. Further, the support frame 16 is fixedly mounted with a photoelectric conversion pulse generator unit 30 which cooperates with the disk 28. The disk 28 and the generator unit 30 constitute a rotary encoder 31 for controlling the rotation of the rotating drum 10 and the movement of a scanning head 34 which will be described in detail later.

Figure 4A:
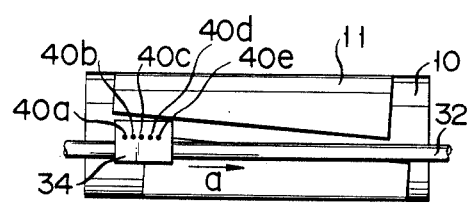
FIG. 4A is a schematic side view taken in the direction indicated by arrow A in FIG. 1.

The support frame 16 is fitted with a guide rod 32 which extends parallel to the axis of the rotating drum 10. The scanning head 34 is movably mounted on the guide rod 32, facing the outer peripheral surface of the rotating drum 10. A head drive motor 36, which is fixed to the support frame 16, is connected to the scanning head 34 by means of a drive wire 38. Thus, the scanning head 34 is driven in the axial direction of the rotating drum 10 along the guide rod 32 by the motor 36. As shown in FIG. 4A, the scanning head 34 includes five scanning elements 40a to 40e arranged along a direction parallel to the axis of the rotating drum 10. As the scanning head 34 is driven in the axial direction of the drum 10 while the drum 10 is rotating, the scanning elements 40a to 40e scan the recording sheet 11 on the outer peripheral surface of the drum 10.

The drum drive motor 20, the driving and driven gears 22 and 26, the rotary encoder 31, and the head drive motor 36 constitute drive means 42 in the present invention.

Figure 3:
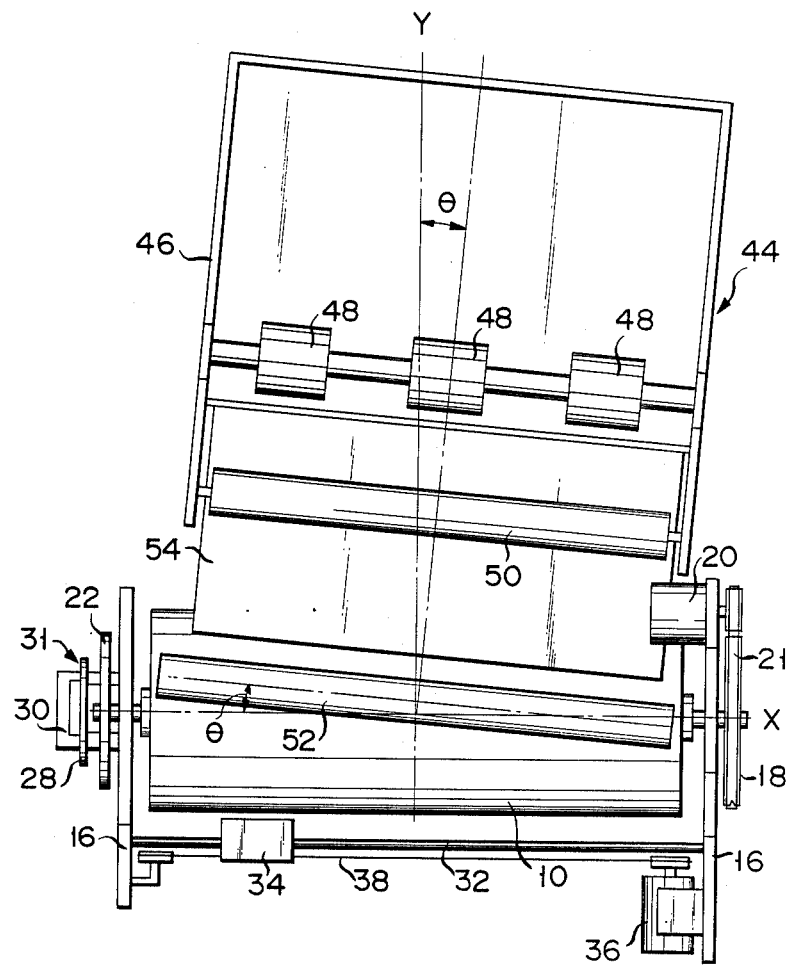

As shown in FIGS. 1 and 3, the scanning apparatus comprises a feed mechanism 44 for feeding the rotating drum 10 with the recording sheet 11. The feed mechanism 44 includes a rectangular paper cartridge 46 storing a number of recording sheets 11. The cartridge 46 is positioned so that its side edge facing the rotating drum 10 is inclined at a predetermined angle $\theta$ to the axis of the rotating drum 10. Also, the feed mechanism 44 includes pickup rollers 48 for taking out the recording sheets 11 one by one from the cartridge 46, a feed roller 50 disposed between the pickup rollers 48 and the rotating drum 10, an elongate sheet clipper 52 disposed on the outer peripheral surface of the drum 10 and adapted to fix the leading end portion of the recording sheet 11 fed thereto to the outer peripheral surface of the drum 10, and a guide plate 54 extending from the cartridge 46 to a position near the drum 10 for guiding the recording sheet 11 being fed. The feed mechanism 44 further includes another sheet clipper (not shown) for fixing the trailing end portion of the recording sheet 11 to the outer peripheral surface of the drum 10. The respective axes of rotation of the pickup rollers 48 and the feed roller 50, and the sheet clipper 52 are inclined at the angle $\theta$ to the axis of the rotating drum 10. If the circumference of the rotating drum 10 is L and the distance covered by the scanning head 34 while the rotating drum 10 makes one revolution is $\Delta L$, the tilt angle $\theta$ is given by $$\theta = \tan^{-1} \Delta L/L.$$

The operation of the scanning apparatus constructed in this manner will now be described.

Figure 4B:
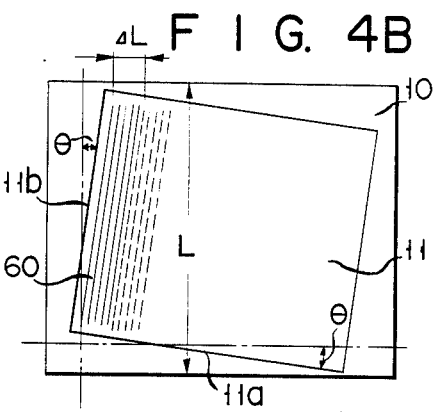

First, the recording sheet 11 is fed to the rotating drum 10 by the feed mechanism 44. In this case, the recording sheets 11 stored in the paper cartridge 46 are taken out one by one therefrom by the pickup roller 48. The recording sheet 11 is delivered to the rotating drum 10 by the feed roller 50, guided by the guide plate 54. When the leading end portion of the recording sheet 11 reaches the sheet clipper 52, it is located on the outer peripheral surface of the rotating drum 10 at the angle $\theta$ to the axis X of the drum 10, since the recording sheet 11 being fed is inclined at the angle $\theta$ to an axis Y perpendicular to the axis X, as seen from FIG. 3. Then, the leading end portion of the recording sheet 11 is fixed to the outer peripheral surface of the rotating drum 10 by the sheet clipper 52. As the drum 10 rotates, thereafter, the recording sheet 11 is wound around the outer peripheral surface of the drum 10, and its trailing end portion is fixed to the outer peripheral surface of the drum 10 by the second sheet clipper. Thus, the recording sheet 11 is wound around the outer peripheral surface of the drum 10 at the angle $\theta$ to the axis of the drum 10. FIG. 4B definitely shows the way the recording sheet 11 is wound.

Subsequently, the drum drive motor 20 and the head drive motor 36 are actuated, so that the rotating drum 10 is rotated in the predetermined direction, and the scanning head 34, synchronized with the rotation of the drum 10, is moved in the direction indicated by arrow a in FIG. 4A. The scanning head 34 continuously moves over the distance $\Delta L$ while the rotating drum 10 makes one revolution. The movement of the scanning head 34 is controlled by the rotary encoder 31. Namely, when the rotating drum 10 is rotated, the driven gear 26 is rotated by the driving gear 22, so that the pulse generating disk 28 is rotated at a speed three times as high as that of the rotating drum 10. Accordingly, the rotary encoder 31 produces thousands of pulses for each revolution of the drum 10 to detect the rotational position of the drum 10, and controls the action of the scanning head 34 in accordance with a detection signal indicative of the detected rotational position. Thus, the scanning head 34 is moved accurately in synchronism with the rotation of the rotating drum 10.

The scanning elements 40a to 40e of the scanning head 34 perform primary scanning on the recording sheet 11 on the drum 10 as the drum 10 rotates, and execute secondary scanning as the scanning head 34 moves. Thus, as seen from FIG. 4B, the scanning line 60 of each scanning element is formed with every revolution of the rotating drum 10. Each scanning line 60 is inclined at the angle $\theta$ ($\theta = \tan^{-1}\Delta L/L$) to the circumferential datum line Y of the drum 10. As mentioned before, the recording sheet 11 is wound on the drum 10 so that its leading end edge or side 11a is inclined at the angle $\theta$ to the axis of the drum 10. Thus, each scanning line 60 is formed in a direction perpendicular to the side 11a of the recording sheet 11, that is, a direction parallel to a side 11b.

In the embodiment described above, the arrangement direction of the scanning elements 40a to 40e and the secondary-scanning direction of the scanning head 34 are set to be parallel to the axis of the rotating drum 10. Accordingly, a segment connecting the respective scanning start positions of the scanning elements and a segment connecting the respective scanning end positions of the scanning elements extend parallel to the axis of the rotating drum 10, that is, at the angle $\theta$ to the side 11a of the recording sheet 11. Therefore, the timing for the start of scanning of each scanning element is corrected in accordance with the position of the scanning element in the secondary-scanning direction and adjusted so that the segment connecting the scanning start positions and the segment connecting the scanning end positions are parallel to the side 11a of the recording sheet 11. This correction may be electrically achieved by electrical signal processing between the respective scanning elements such that the scanning start timing for each elements is delayed so that the segment connecting the scanning start positions extend at the angle $\theta$ with respect to the axis of the drum 10. This signal processing may be more easily accomplished than in the case where the tilt of the scanning lines in th primary-scanning direction is removed electrically.

Constructed in this manner, the scanning apparatus has the following advantages.

First, the recording sheet 11 is wound around the outer peripheral surface of the rotating drum 10 so that its leading end edge or side 11a is inclined at the angle $\theta$ to the axis of the drum 10. The scanning head having a plurality of scanning elements is moved in a direction parallel to the axis of the drum in synchronism with the rotation of the drum. Accordingly, the scanning lines 60 of the scanning elements 40a to 40e are arranged in a direction perpendicular to the side 11a of the recording sheet 11. When applying this scanning apparatus to a printer, therefore, information can be recorded parallel to one side of the recording sheet. In ordinary original copies, characters are generally recorded along lines parallel to one side of the sheet. If the scanning apparatus is applied to a reader, therefore, the scanning line of each scanning element is formed parallel to the one side of the original copy, permitting accurate scanning of each line of the original.

If the rotation of the rotating drum 10 and the movement of the scanning head 34 are controlled by means of the rotary encoder 31, as in the present embodiment, the rotary encoder 31 normally requires thousands of pulses or more for each revolution of the drum 10. Accordingly, the prior art apparatuses require a large-sized, expensive rotary encoder, since the pulse generating disk of the rotary encoder in the conventional apparatuses is coupled directly to the rotating drum. This requirement is particularly essential if recording or reading is executed using a large image. According to this embodiment, however, the pulse generating disk 28 of the rotary encoder 31 is coupled to the small-diameter driven gear 26 which is in mesh with the driving gear 22 coupled directly to the rotating drum 10, so that the disk 28 rotates at a speed three times as high as that of the rotating drum 10. Accordingly, the rotary encoder 31 can produce pulses three times as many as those produced by the one in which the disk is coupled directly to the drum. Thus, sufficient pulses may be obtained with use of small, low-priced rotary encoders.

In image processing apparatuses, such as a printer, document scanners, etc., if picture elements aligned in the primary-scanning direction on the adjacent scanning lines are dislocated, such dislocation will be conspicuous. According to the present embodiment, the teeth of the driving gear 22 are three times as many as those of the driven gear 26, so that the speed or rotational frequency of the rotary encoder 31 is three times as high as that of the rotating drum 10. Therefore, the mating teeth of the driving and driven gears 22 and 26 meet in the same combinations throughout the revolutions of the driving gear 22, and a certain point on the rotary encoder 31 invariably produces a position signal indicative of the same position of the rotating drum 10. Accordingly, if the encoder 31 operates irregularly due to irregular teeth of the gear(s) or if the gears 22 and 26 are mounted eccentrically, the influence of such an awkward situation is exerted on the same position throughout the revolutions of the drum 10. Thus, the picture elements on the aligned positions of the adjacent scanning lines can exactly be prevented from being dislocated.

It is to be understood that the present invention is not limited to the embodiment described above, and that various changes and modifications may be effected therein without departing from the scope or spirit of the invention.

Figure 5A:
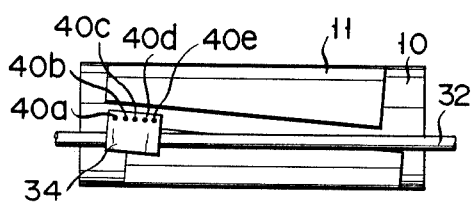
Figure 5B:
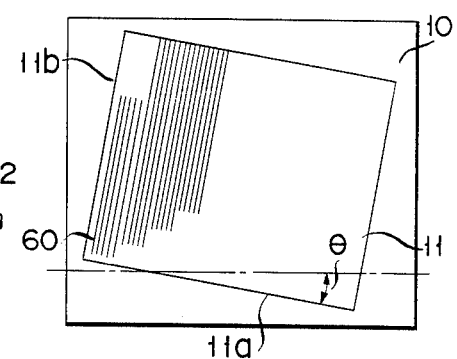

FIGS. 5A and 5B show a first modification of the present invention. The description to follow refers only to those portions of the first modification which are different in construction from their counterparts in the above embodiment.

In this first modification, the scanning elements 40a to 40e of the scanning head 34 are arranged in a direction at the angle $\theta$ to the axis of the rotating drum 10, that is, a direction parallel to the side 11a of the recording sheet 11. The scanning head 34 is subjected to secondary scanning in a direction parallel to the axis of the rotating drum 10. As shown in FIG. 5B, the scanning lines 60 of the scanning elements 40a to 40e are formed parallel to the side 11b of the recording sheet 11, and the segment connecting the scanning start positions of the scanning elements and the segment connecting the scanning end positions are parallel to the side 11a of the recording sheet 11.

In this modification, the scanning elements are aligned in a direction parallel to the side 11a of the sheet 11, so that, unlike the above-described embodiment, the first modification does not require adjustment of the scanning start timing between the respective scanning elements, permitting simple construction of the signal processing circuit. However, the first modification requires adjustment of the scanning start timing for the scanning elements for each revolution of the drum 10.

Figure 6A:
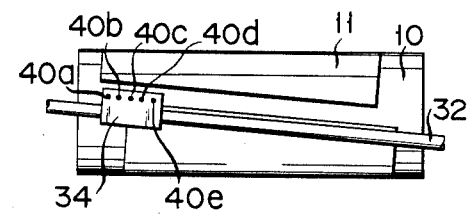
Figure 6B:
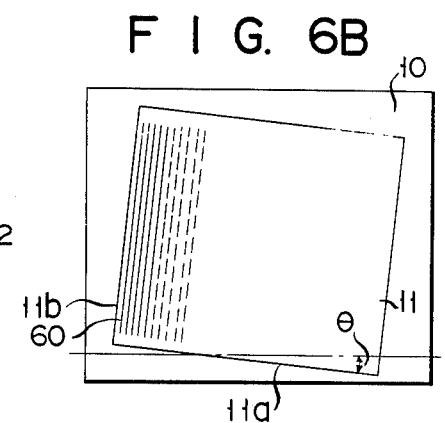

According to a second modification shown in FIGS. 6A and 6B, moreover, the guide rod 32 for guiding the scanning head 34 extends in a direction at the angle θ to the axis of the rotating drum 10, and the scanning elements 40a to 40e are arranged in a direction parallel to the guide rod 32.

According to this second modification, the scanning lines of the scanning elements are formed parallel to the side 11b of the recording sheet 11, and the segment connecting the scanning start positions of the scanning elements and the segment connecting scanning end positions are parallel to the side 11a of the recording sheet 11. Thus, the scanning lines exactly parallel to the side 11b of the recording sheet 11 can successively be formed by mechanical means without use of any electrical processing circuit.

Figure 7A:
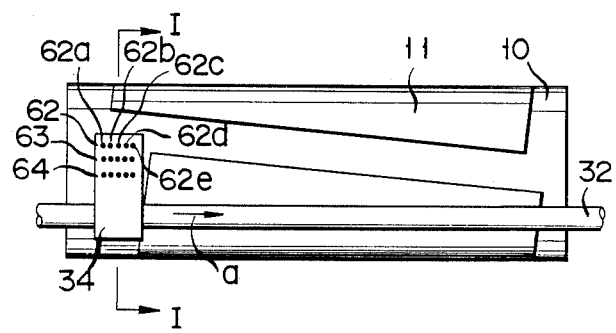
Figure 7B:
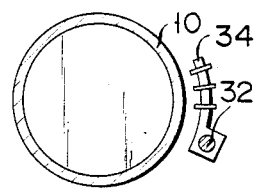

FIGS. 7A and 7B show a scanning apparatus with a multi-type scanning head which includes a plurality of scanning element rows. In this apparatus, other components than the scanning head are constructed in the same manner as their counterparts in the above embodiment, so that a description of those components is omitted.

According to this third modification, the scanning head 34 includes three scanning element rows 62, 63 and 64 which extend in the axial direction of the rotating drum 10, spaced in a direction perpendicular to the axis of the drum 10. Each of the scanning element rows 62, 63 and 64 includes five scanning such as elements 62a to 62efor row 62. The elements are arranged at regular pitches in the axial direction of the drum 10.

In scanning the recording sheet 11 by means of the scanning head 34 of this modification, the scanning start timing for the individual scanning element rows is staggered in accordance with the intervals between the rows so that the scanning lines defined by the scanning element rows are aligned with one another. As a result, the same portion of the recording sheet 11 can be repeatedly scanned corresponding to the number of scanning element rows, i.e., three times. Thus, color printing can be accomplished with use of a single scanning head, that is, without using a plurality of scanning heads.

Figure 8:
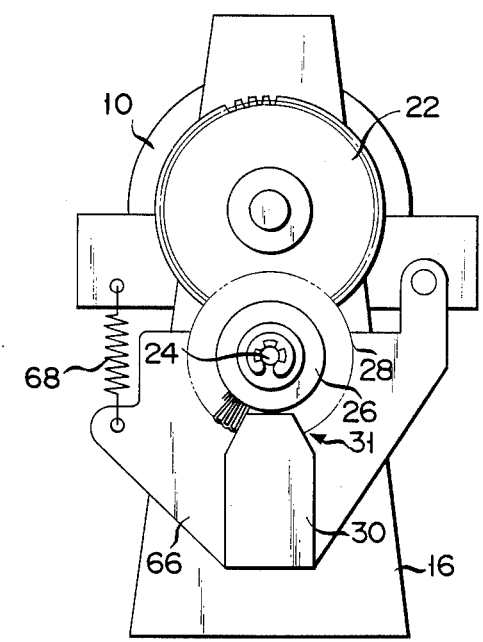
FIG. 8 is a side view showing a modified example of a drive mechanism.

FIG. 8 shows a modified example of the drive means. In this example, a support plate 66 is rockably mounted on the support frame 16 which supports the rotating drum 10, and the rotary encoder 31 is attached to the support plate 66. Thus, the driven gear 26 in mesh with the driving gear 22 coupled to the rotating drum 10 is mounted on the support plate 66, and the pulse generating disk 28 is fixed to the driven gear 26. Likewise, the photoelectric conversion pulse generator unit 30 is fixed to the support plate 66. A tension spring 68 is stretched between the support frame 16 and the support plate 66, whereby the driven gear 26 is urged in a direction such that the distance between the axes of the driving and driven gears 22 and 26 is shortened.

According to the modified example constructed in this manner, the driven gear 26 is urged toward the driving gear 22, so that the two gears can engage without backlash even if they are subject to eccentricity or wear. Thus, it is possible to effectively prevent the accuracy of positional transmission from the rotating drum 10 to the rotary encoder 31 from being lowered by backlash.

In the embodiment and modifications described above, gears are used for the driving and driven members. However, the present invention is not limited to the precise embodiment or modifications, and the gears may be replaced with pulleys and a belt stretched between the pulleys.

What is claimed is:

1. A helical scanning apparatus with a plurality of scanning elements comprising:

a rotating drum disposed for rotation;

storing means for storing rectangular objects of scanning;

feed means for feeding one of the rectangular objects of scanning to the rotating drum from said storing means and for winding the object around the drum so that one side of the object is inclined at a predetermined angle θ to the axis of the rotating drum, said feed means feeding the rectangular object of scanning to the rotating drum along a feeding direction which is inclined at said predetermined angle θ to a line perpendicular to the axis of the rotating drum;

a scanning head movable in a predetermined direction along the outer peripheral surface of the rotating drum on which the object is wound, said scanning head including a plurality of scanning elements for forming on said object scanning lines extending at right angles to the one side of the object as the drum rotates and the scanning head moves; and drive means for rotating the rotating drums and for driving the scanning head in synchronism with the rotation of the drum;

wherein said predetermined angle θ is given by $\theta = \tan^{-1} \Delta L/L$, where L is the circumference of the rotating rum and ΔL is the distance covered by the scanning head while he drum makes one revolution.

2. The scanning apparatus according to claim 1, wherein said scanning head is disposed to be movable in a direction parallel to the axis of the rotating drum, and said scanning elements are arranged in the direction parallel to the axis of the rotating drum.

3. The scanning apparatus according to claim 1, wherein said scanning head is disposed to be movable in a direction parallel to the axis of the rotating drum, and said scanning elements are arranged in a direction inclined at the angle θ to the axis of the rotating drum.

4. The scanning apparatus according to claim 1, wherein said scanning head is disposed to be movable in a direction inclined at the angle θ to the axis of the drum, and said scanning elements are arranged in the direction inclined at the angle θ to the axis of the drum.

5. The scanning apparatus according to claim 1, wherein said scanning head is disposed to be movable in a direction parallel to the axis of the drum and includes a plurality of scanning element rows each consisting of a plurality of scanning elements, said scanning element rows extending in the direction parallel to the axis of the rotating drum and being spaced in a direction perpendicular to the axis of the drum.

6. The scanning apparatus according to claim 1, wherein said drive means includes a drum drive motor for driving the rotating drum, a head drive motor for driving the scanning head, a driving member rotating integrally with the rotating drum, a driven member drivingly associated with the driving member and rotating at a rotational frequency higher than that of the driving member, and a rotary encoder for detecting the rotational position of the rotating drum and controlling the movement of the scanning head in response to a detection signal indicative of the detected rotational position, said rotary encoder including a pulse generating disk rotating integrally with the driven member and a photoelectric conversion pulse generator unit cooperating with the disk.

7. The scanning apparatus according to claim 6, wherein said driven member rotates at a rotational frequency equal to an integral multiple of that of the driving member.

8. The scanning apparatus according to claim 7, wherein said driving member comprises a driving gear and said driven member comprises a driven gear directly in mesh with the driving gear, the number of teeth of said driving gear being an integral multiple of that of the driven gear.

9. The scanning apparatus according to claim 8, wherein said drive means further includes an urging mechanism for urging the rotary encoder and the driven gear in a direction such that the distance between the axes of the driving and driven gears is reduced.

10. The scanning apparatus according to claim 1, wherein said feed means includes a feed roller having an axis and arranged so that the axis of the feed roller is inclined at the angle $\theta$ to the axis of the rotating drum.

11. The scanning apparatus according to claim 1, wherein said storing means includes a rectangular cartridge for storing the rectangular objects of scanning, the cartridge having a side surface which faces the rotating drum and which is inclined at the angle $\theta$ to the axis of the rotating drum.

12. The scanning apparatus according to claim 11, wherein said feed means includes pickup rollers being in contact with one of the rectangular objects of scanning stored in the cartridge which is to be fed to the rotating drum, the pickup rollers being for picking up the one object from the cartridge, the pickup rollers having a common axis which is inclined at the angle $\theta$ to the axis of the rotating drum.

13. The scanning apparatus according to claim 1, further comprising an object clipper arranged on a peripheral surface of the rotating drum so as to be inclined at the angle $\theta$ to the axis of the rotating drum for clipping a leading end portion of the object fed by the feed means.

14. A helical scanning apparatus with a plurality of scanning elements, comprising:
a rotating drum disposed for rotation;
feed means for feeding a rectangular object of scanning to the rotating drum and for winding the object around the drum so that one side of the object is inclined at a predetermined angle $\theta$ to the axis of the rotating drum;
a scanning head movable in a direction parallel to the axis of the drum along the outer peripheral surface of the rotating drum on which the object is wound, said scanning head including a plurality of scanning elements for forming on the object scanning lines extending at right angles to the one side of the object as the drum rotates and the scanning head moves, the elements being arranged in a direction inclined at the angle $\theta$ to the axis of the drum; and
drive means for rotating the rotating drum and for driving the scanning head in synchronism with the rotation of the drum;
wherein said predetermined angle $\theta$ is given by $\theta = \tan^{-1} \Delta L/L$, where L is the circumference of the rotating drum and $\Delta L$ is the distance covered by the scanning head while the drum makes one revolution.

15. A helical scanning apparatus with a plurality of scanning elements, comprising:
a rotating drum disposed for rotation;
feed means for feeding a rectangular object of scanning to the rotating drum and for winding the object around the drum so that one side of the object is inclined at a predetermined angle $\theta$ to the axis of the rotating drum;
a scanning head movable in a direction inclined at the angle $\theta$ to the axis of the drum along the outer peripheral surface of the rotating drum on which the object is wound, said scanning head including a plurality of scanning elements for forming on the object scanning lines extending at right angles to the one side of the object as the drum rotates and the scanning head moves, the elements being arranged in a direction inclined at the angle $\theta$ to the axis of the drum; and
drive means for rotating the rotating drum and for driving the scanning head in synchronism with the rotation of the drum;
wherein said predetermined angle $\theta$ is given by $\theta = \tan^{-1} \Delta L/L$, where L is the circumference of the rotating drum and $\Delta L$ is the distance covered by the scanning head while the drum makes one revolution.

* * * * *